United States Patent
Greer

(10) Patent No.: US 9,183,122 B2
(45) Date of Patent: Nov. 10, 2015

(54) AUTOMATED PROGRAM TESTING TO FACILITATE RECREATION OF TEST FAILURE

(75) Inventor: Timothy D. Greer, Endicott, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 146 days.

(21) Appl. No.: 13/616,122

(22) Filed: Sep. 14, 2012

(65) Prior Publication Data
US 2014/0082420 A1    Mar. 20, 2014

(51) Int. Cl.
G06F 11/36    (2006.01)

(52) U.S. Cl.
CPC ........ *G06F 11/3692* (2013.01); *G06F 11/3684* (2013.01)

(58) Field of Classification Search
CPC .......................... G06F 11/3692; G06F 11/3684
USPC ........................................ 714/26, 33, 37, 38.1
See application file for complete search history.

(56) References Cited

U.S. PATENT DOCUMENTS

| 6,002,869 | A  | * | 12/1999 | Hinckley ..................... 717/124 |
| 6,892,254 | B2 | * | 5/2005  | Suzuki et al. ................. 710/62 |
| 7,017,150 | B2 | * | 3/2006  | Lam et al. .................... 717/124 |
| 7,117,484 | B2 | * | 10/2006 | Hartman et al. ............. 717/126 |
| 7,539,977 | B1 |   | 5/2009  | Bloom |
| 7,647,528 | B2 | * | 1/2010  | Yilmaz et al. ................ 714/38.1 |
| 7,661,031 | B2 | * | 2/2010  | Birsan et al. ................. 714/38.1 |
| 7,844,861 | B2 | * | 11/2010 | Hegarty et al. .............. 714/46 |
| 7,913,230 | B2 | * | 3/2011  | Vikutan ....................... 717/124 |
| 7,958,403 | B2 | * | 6/2011  | Noble .......................... 714/39 |
| 8,145,942 | B2 | * | 3/2012  | Nguyen ...................... 714/6.31 |
| 8,239,835 | B2 | * | 8/2012  | Rex et al. .................... 717/127 |
| 8,745,590 | B2 | * | 6/2014  | Mujeeb et al. .............. 717/125 |
| 8,776,042 | B2 | * | 7/2014  | Hughes ....................... 717/170 |
| 8,826,084 | B1 | * | 9/2014  | Gauf et al. ................... 714/46 |
| 2005/0066234 | A1 | * | 3/2005 | Darringer et al. ........... 714/38 |
| 2005/0204201 | A1 | * | 9/2005 | Meenakshisundaram et al. ............................. 714/38 |
| 2006/0184928 | A1 | * | 8/2006 | Hughes ....................... 717/168 |
| 2007/0220370 | A1 | * | 9/2007 | Branda et al. ................ 714/49 |

(Continued)

OTHER PUBLICATIONS

IBM Technical Disclosure Bulletin, ADF Execution Exec, Jun. 1, 1984, IBM Corporation, vol. 27, pp. 607-608.*

(Continued)

*Primary Examiner* — Gabriel Chu
*Assistant Examiner* — Paul Contino
(74) *Attorney, Agent, or Firm* — William A. Kinnaman, Esq.; Matthew M. Hulihan, Esq.; Heslin Rothenberg Farley & Mesiti, P.C.

(57) ABSTRACT

Automated program testing is facilitated. Test results generated based on performance of one or more tests by a program are obtained, where a test passes or fails based on output obtained based on performance of the test by the program. A failure output of the test results is identified, the failure output being of a failing test that includes at least one command, and the failure output being obtained based on performing the at least one command. A modified test is automatically generated based on the failing test, where the modified test is provided for performance thereof by the program to facilitate testing of the program. The modified test includes the at least one command of the failing test, and the modified test passes based on obtaining the identified failure output of the failing test.

17 Claims, 11 Drawing Sheets

(56) References Cited

U.S. PATENT DOCUMENTS

| | | | |
|---|---|---|---|
| 2007/0263546 A1* | 11/2007 | Chowdhury et al. | 370/242 |
| 2008/0120521 A1* | 5/2008 | Poisson et al. | 714/26 |
| 2008/0126880 A1* | 5/2008 | Hegarty et al. | 714/46 |
| 2008/0184206 A1* | 7/2008 | Vikutan | 717/127 |
| 2009/0249121 A1* | 10/2009 | Kube et al. | 714/32 |
| 2010/0030626 A1* | 2/2010 | Hughes et al. | 705/11 |
| 2011/0016358 A1* | 1/2011 | Randimbivololona et al. | 714/38 |
| 2011/0113287 A1* | 5/2011 | Gururaj | 714/37 |
| 2011/0145643 A1 | 6/2011 | Kumar et al. | |
| 2012/0239986 A1* | 9/2012 | Kraus et al. | 714/49 |
| 2012/0253728 A1* | 10/2012 | Chamas et al. | 702/109 |
| 2013/0097586 A1* | 4/2013 | Chandra et al. | 717/124 |
| 2014/0068325 A1* | 3/2014 | Masser et al. | 714/15 |

OTHER PUBLICATIONS

Microsoft Corporation, Microsoft Computer Dictionary, 2002, Microsoft Press, Fifth Edition, p. 467.*

IBM Technical Disclosure, "Method and System for Reproducing Randomly Generated Test Cases Using Multiple Seed-Based Input Data," IPCOM000191478D, 3 pages (Jan. 5, 2010).

* cited by examiner

```
H: 1 Initial set up                                              200
C: msg * Who am I?
C: q v 1F1F
E: Device 1F1F does not exist
C: DEF T3390 1F1F cyl 5 ———— 202a
E: DASD 1F1F DEFINED
C: format 1F1F b#1#tempy1 ———— 202b
C: Q DISK
E: TEMPY1 1F1F B   R/W    5 3390
...

H: 5 DMSQEFL and DMSQSFSL Tests
D: /*--- Requires DMSTESTS EXEC ---*/
C: LINK WEECHUG 191 1191 RR ———— 204a
C: ACC 1191 K ————
C: SET FILEPOOL SERVCT: ———— 204b
C: DMSTESTS
E: SFS_SERVER_LEVEL=84
E: CP_PRODUCT=20
E: CP_SERVICE_LEVEL=0
ES: CMS_LEVEL=84
ES: CMS_SERVICE_LEVEL=0
ES: DMSQEFL_MACRO
ES: CMS_LEVEL=84

H: 6 CMSLEVEL Test
D: /*--- Requires QLEVEL MODULE, which does a CMSCALL EPLIST=QCMSLVL --*/
C: ACCESS 1F1F B ———— 206a
C: pipe literal /* Temp file for RELSPEC.HATT */ |>  CMSMAC EXEC B
C: pipe literal Address COMMAND 'QLEVEL'     |>> CMSMAC EXEC B ———— 206b
C: pipe literal Parse Pull r0                |>> CMSMAC EXEC B
C: pipe literal Parse Pull r1                |>> CMSMAC EXEC B
C: pipe literal say 'R0, R1 =' c2x(R0)',' c2x(R1)   |>> CMSMAC EXEC B
C: CMSMAC ———— 206c
E: CMS Level 27, Service Level 000 ———— 206d

```
H: 6 CMSLEVEL Test
D: /*--- Requires QLEVEL MODULE, which does a CMSCALL EPLIST=QCMSLVL --*/
C: ACCESS 1F1F B
C: pipe literal /* Temp file for RELSPEC.HATT */ |>  CMSMAC EXEC B
C: pipe literal Address COMMAND 'QLEVEL'        |>> CMSMAC EXEC B
C: pipe literal Parse Pull r0                   |>> CMSMAC EXEC B
C: pipe literal Parse Pull r1                   |>> CMSMAC EXEC B
C: pipe literal say 'R0, R1 =' c2x(R0)',' c2x(R1)  |>> CMSMAC EXEC B
C: CMSMAC
E: CMSMAC
E: CMS Level 26, Service Level 0000
E: R0, R1 = 00000000, 000E0000
E: Ready; T=0.01/0.01 $$:$$:$$       602a
N: CMS Level 27, Service Level 000   604
```

{ 600 encloses entire box; 602 encloses E: lines; 602a points to $$:$$:$$ }

FIG. 6

```
...
C: CMSMAC

CMSMAC                    ⎫
Unknown CP/CMS command    ⎬ —702
                          ⎭                              RUNNING  GDLFCFT E: CMSMAC
E: CMS Level 26, Service Level 0000
ERROR: Output MISMATCH on
E: CMS Level 26, Service Level 0000
...
```

FIG. 7

```
          ⎧ H: 1 Initial set up                                              800
          ⎪ C: msg * Who am I?
          ⎪ C: q v 1F1F
          ⎪ E: Device 1F1F does not exist
    202 ⎨  C: DEF T3390 1F1F cyl 5
          ⎪ E: DASD 1F1F DEFINED
          ⎪ C: format 1F1F b#1#tempy1
          ⎪ C: Q DISK
          ⎩ E: TEMPY1 1F1F B R/W 5 3390

⎧ H: 6 CMSLEVEL Test
          ⎪ D: /*-- Requires QLEVEL MODULE, which does a CMSCALL EPLIST=QCMSLVL --*/
          ⎪ C: ACCESS 1F1F B
          ⎪ C: pipe literal /* Temp file for RELSPEC.HATT */ |>   CMSMAC EXEC B
          ⎪ C: pipe literal Address COMMAND 'QLEVEL'          |>> CMSMAC EXEC B
          ⎪ C: pipe literal Parse Pull r0                     |>> CMSMAC EXEC B
          ⎪ C: pipe literal Parse Pull r1        —802         |>> CMSMAC EXEC B
    600 ⎨  C: pipe literal say 'R0, R1 =' c2x(R0)',' c2x(R1)  |>> CMSMAC EXEC B
          ⎪ C: CMSMAC
          ⎪ E: CMSMAC
          ⎪ E: CMS Level 26, Service Level 0000
          ⎪ E: R0, R1 = 00000000, 000F0000
          ⎪ E: Ready; T=0.01/0.01 $$:$$:$$
          ⎩ N: CMS Level 27, Service Level 000
```

C: CMSMAC

CMSMAC
    2 *-* Address COMMAND 'QLEVEL'  ⎤
    +++ RC(-3) +++              ⎬ — 902
                          ⎦

VM READ   GDLFCFT

E: CMSMAC
E: CMS Level 26, Service Level 0000
ERROR: Output MISMATCH on
E: CMS Level 26, Service Level 0000
...

FIG. 9

```
                                                                    1000
    ⎧  H: 1 Initial set up
    ⎪  C: msg * Who am I?
    ⎪  C: q v 1F1F
    ⎪  E: Device 1F1F does not exist
202⎨  C: DEF T3390 1F1F cyl 5
    ⎪  E: DASD 1F1F DEFINED
    ⎪  C: format 1F1F b#1#tempy1
    ⎪  C: Q DISK
    ⎩  E: TEMPY1 1F1F B    R/W      5   3390

⎧  H: 5 DMSQEFL and DMSQSFSL Tests
    ⎪  D: /*--- Requires DMSTESTS EXEC ---*/
    ⎪  C: LINK WEECHUG 191 1191 RR
    ⎪  C: ACC 1191 K
    ⎪  C: SET FILEPOOL SERVCT:
    ⎪  C: DMSTESTS
    ⎪  E: SFS_SERVER_LEVEL=84
204⎨  E: CP_PRODUCT=20
    ⎪  E: CP_SERVICE_LEVEL=0
    ⎪  ES: CMS_LEVEL=84
    ⎪  ES: CMS_SERVICE_LEVEL=0
    ⎪  ES: DMSQEFL_MACRO
    ⎩  ES: CMS_LEVEL=84

⎧  H: 6 CMSLEVEL Test
    ⎪  D: /*-- Requires QLEVEL MODULE, which does a CMSCALL EPLIST=QCMSLVL --*/
    ⎪  C: ACCESS 1F1F B
    ⎪  C: pipe literal /* Temp file for RELSPEC.HATT */ |>  CMSMAC EXEC B
    ⎪  C: pipe literal Address COMMAND 'QLEVEL'     |>> CMSMAC EXEC B
    ⎪  C: pipe literal Parse Pull r0                |>> CMSMAC EXEC B
    ⎪  C: pipe literal Parse Pull r1                |>> CMSMAC EXEC B
600⎨  C: pipe literal say 'R0, R1 =' c2x(R0)',' c2x(R1)   |>> CMSMAC EXEC B
    ⎪  C: CMSMAC
    ⎪  E: CMSMAC
    ⎪  E: CMS Level 26, Service Level 0000
    ⎪  E: R0, R1 = 00000000, 000F0000
    ⎪  E: Ready; T=0.01/0.01 $$:$$:$$
    ⎩  N: CMS Level 27, Service Level 000
```

FIG. 10

AUTOMATED PROGRAM TESTING TO FACILITATE RECREATION OF TEST FAILURE

BACKGROUND

In an automated software test environment for testing a software program, typically thousands of tests are run daily. A test can include one or more commands and expected or non-expected outputs from the performance of those commands. One or more tests can be combined and included in a test script, and execution of the program follows the test(s) laid out in the test script. Performance of a test is automated and the outcome of performing the test is either a pass or failure, determined by whether the specified expected (or non-expected) output is obtained. After performance of the tests, test failures are typically analyzed, however this is often an inefficient expenditure of resources.

BRIEF SUMMARY

The shortcomings of the prior art are overcome and additional advantages are provided through the provision of a method for facilitating automated program testing. The method includes, for instance: obtaining test results generated based on performance of one or more tests by a program, wherein a test passes or fails based on output obtained based on performance of the test by the program; identifying a failure output of the test results, the failure output being of a failing test of the one or more tests, the failing test including at least one command, and the failure output being obtained based on performing the at least one command; and automatically generating, by a processor, a modified test based on the failing test, the modified test for performance thereof by the program to facilitate testing of the program, and the modified test including the at least one command, wherein the modified test passes based on obtaining the identified failure output of the failing test.

Additionally provided is a computer system for facilitating automated program testing. The computer system includes a memory and a processor, in communications with the memory, and the computer system is configured to perform, for instance: obtaining test results generated based on performance of one or more tests by a program, wherein a test passes or fails based on output obtained based on performance of the test by the program; identifying a failure output of the test results, the failure output being of a failing test of the one or more tests, the failing test including at least one command, and the failure output being obtained based on performing the at least one command; and automatically generating a modified test based on the failing test, the modified test for performance thereof by the program to facilitate testing of the program, and the modified test including the at least one command, wherein the modified test passes based on obtaining the identified failure output of the failing test.

Further provided is a computer program product for facilitating automated program testing. The computer program product includes a computer readable storage medium readable by a processor and storing program code for execution by the processor to perform a method that includes, for instance: obtaining test results generated based on performance of one or more tests by a program, wherein a test passes or fails based on output obtained based on performance of the test by the program; identifying a failure output of the test results, the failure output being of a failing test of the one or more tests, the failing test including at least one command, and the failure output being obtained based on performing the at least one command; and automatically generating a modified test based on the failing test, the modified test for performance thereof by the program to facilitate testing of the program, and the modified test including the at least one command, wherein the modified test passes based on obtaining the identified failure output of the failing test.

Additional features and advantages are realized through the concepts of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2 depicts an example original test script including multiple tests, for automated testing of a program;

FIG. 6 depicts an example modified test, in accordance with one or more aspects of the present invention;

FIG. 7 depicts a portion of test results obtained based on running the modified test of FIG. 6, in accordance with one or more aspects of the present invention;

FIG. 8 depicts one example of a test script including the modified test of FIG. 6 and an initial test, in accordance with one or more aspects of the present invention;

FIG. 9 depicts a portion of test results obtained based on running the test script of FIG. 8, in accordance with one or more aspects of the present invention;

FIG. 10 depicts another example of a test script including the modified test of FIG. 6 and multiple additional tests, in accordance with one or more aspects of the present invention;

DETAILED DESCRIPTION

It may be desirable, for test failures that appear to represent real bugs in the software being tested, to determine steps that will recreate the specific failure. The ability to recreate the specific failure can provide information useful in developing fixes for the issue, as well as for verifying that those fixes properly address the problem. An effective tool is therefore desirable for recreating test failure in order to facilitate automated program testing.

Recreation of test failure can be as simple as reissuing a failing command, but often times this is not the case. Frequently, recreation of a test failure is a much more complex task, especially when the failure cannot be reliably or consistently recreated, if at all. Many test failures actually lie between these extremes, where some set up is required to create the conditions needed for the particular failure to be triggered. Identifying which of these extremes to which the test failure is closest is largely based on chance, consisting mainly of guessing by a program tester how the failure might be recreated, and going through a tedious trial and error process. A lot of time can be spent pursuing possible recreations. Since much (in the way of testing during performance of the test script) may have occurred before the failure result was obtained, it can be inefficient, unhelpful, and therefore undesirable to simply replay the entire test script up to the point of failure. This consumes time and is inconvenient for, i.e. the developer, if he/she must follow a prohibitively long procedure to identify the true problem. It is therefore desirable to identify a minimal 'recipe' for demonstrating the failure. 'Minimal' refers to a comparatively smaller set of testing (than the entire testing prior to the failure) which recreates the failure output, rather than, for instance, the bare minimum activity needed to recreate the failure output (such as minimum keystrokes, for instance).

In accordance with aspects of the present invention, automated program testing using an original test structure produces an output file showing activity driven by the automated testing, and highlighting a failure output of a failing test, if present. The failure output is revised into an expected output for a modified version of the failing test. This modified test case is defined to pass only if the failing output (from the failing test) is obtained. This modified test is then subset (in follow-on test scripts) in ways suggested by the original test structure, and the subset test scripts are used to attempt recreation of the failure. The attempts are made in a predetermined order, balancing the desirability of a minimal recreation of the error with the need to prove that recreation is possible. All of the above can be automated.

Figure 1:
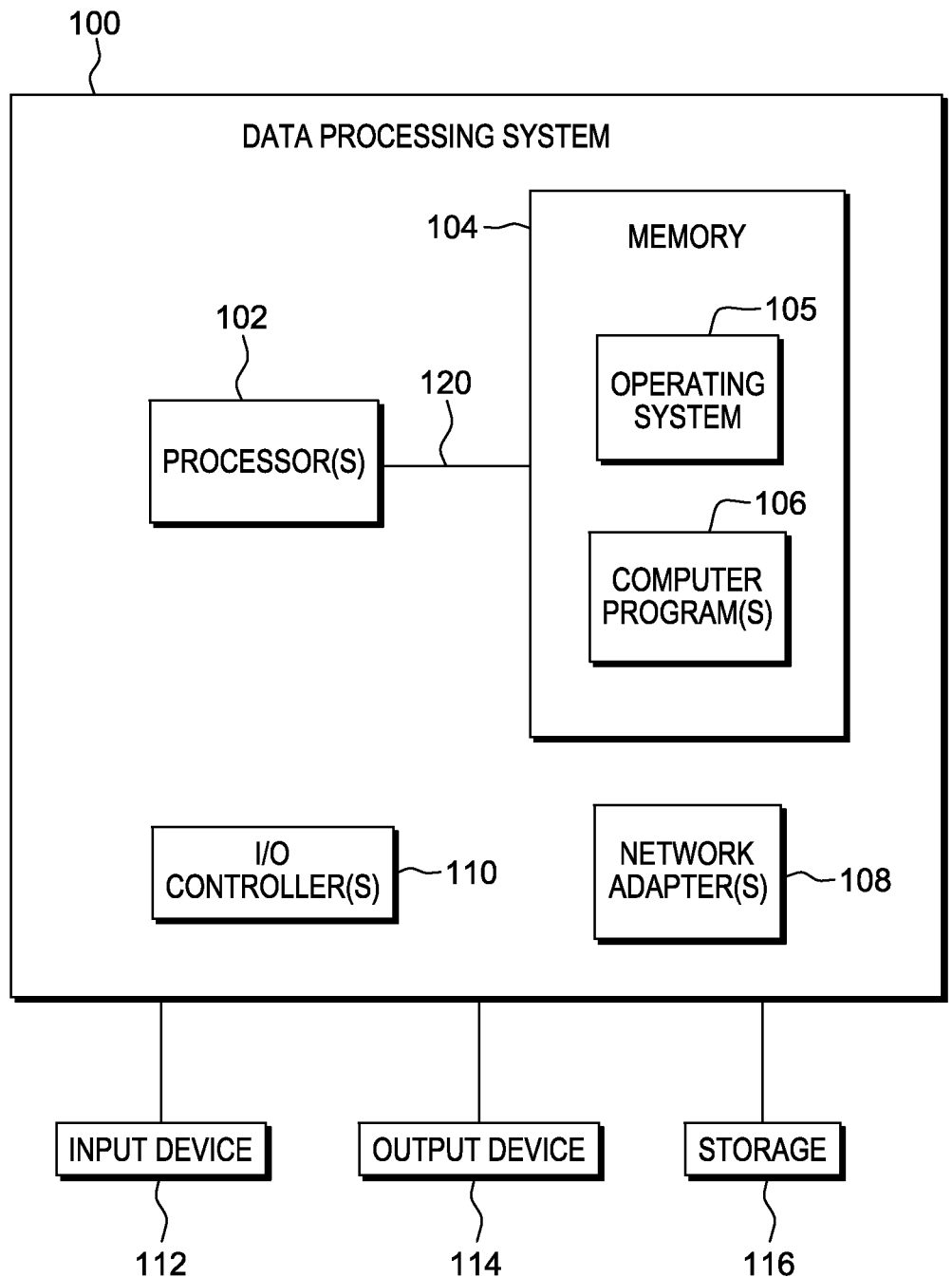
FIG. 1 depicts one example of a data processing system to incorporate and use one or more aspects of the present invention.

FIG. 1 depicts one example of a data processing system to incorporate and use one or more aspects of the present invention. Data processing system 100 may be based on, for instance, the xSeries® or pSeries® architectures offered by International Business Machines Corporation, Armonk, N.Y. (xSeries® and pSeries® are registered trademarks of International Business Machines Corporation, Armonk, N.Y.), or on Intel Corporation's x86 architecture.

Data processing system 100 is suitable for storing and/or executing program code and includes at least one processor 102 coupled directly or indirectly to memory 104 through, e.g., a system bus 120. In operation, processor(s) 102 obtain from memory 104 one or more instructions for execution by the processors. Memory 104 may include local memory employed during actual execution of the program code, bulk storage, and cache memories which provide temporary storage of at least some program code in order to reduce the number of times code must be retrieved from bulk storage during program code execution. A non-limiting list of examples of memory 104 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 104 includes an operating system 105 and one or more computer programs 106.

Input/Output (I/O) devices 112, 114 (including but not limited to keyboards, displays, pointing devices, etc.) may be coupled to the system either directly or through I/O controllers 110.

Network adapters 108 may also be coupled to the system to enable the data processing system to become coupled to other data processing systems or remote printers or storage devices through intervening private or public networks. Modems, cable modems, and Ethernet cards are just a few of the currently available types of network adapters 108.

Data processing system 100 may be coupled to storage 116 (e.g., a non-volatile storage area, such as magnetic disk drives, optical disk drives, a tape drive, etc.), having one or more databases. Storage 116 may include an internal storage device or an attached or network accessible storage. Computer programs in storage 116 may be loaded into memory 104 and executed by a processor 102 in a manner known in the art.

The data processing system 100 may include fewer components than illustrated, additional components not illustrated herein, or some combination of the components illustrated and additional components. Data processing system 100 may include any computing device known in the art, such as a mainframe, server, personal computer, workstation, laptop, handheld computer, telephony device, network appliance, virtualization device, storage controller, etc.

In one example, data processing system 100 executes a computer program 106 that includes a testing facility (which itself may be a computer program), such as the CHUG test tool ("CHUG", available from International Business Machines Corporation, Armonk, N.Y., USA). CHUG utilizes a test script to receive test(s) and determine whether a test passes. Individual tests consist of a series of records including commands for performance by a computer program being tested, such as commands that simulate commands invoked by a human typing on a keyboard to input the commands into the program being tested. The individual tests also include expected and/or nonexpected output and various test control functions. When there is a violation of output expectations as indicated in the script, the individual test, for which the violation occurs, fails.

Typically many individual tests are grouped in a single test file (script), and these test files are collected and executed in a hierarchy (such as part of a larger test script). A test file for the CHUG tool is known as a HATT file, and the start of individual tests, arranged in groups, are delimited by lines beginning with 'H:'. Each H: group can therefore be thought of as an individual test and multiple H: groups can be included in a larger collection of tests called a test script.

Testing follows in the order of the H: groups of the test script. Each H: group passes or fails independently of the other H: groups. However, since tests are executed successively, what occurs from performance of an earlier H: group can affect passage or failure of a later H: group. Thus, testers can put crucial set up activity in the beginning of the test script, such as in the first one or two tests.

The CHUG test tool generates and outputs test results. In one example, the output is in HTML format. The HTML output is presented by test, i.e. by H: group, with the test input information (copied from the HATT file test script) displayed, followed by the line-by-line result(s) of that test. The CHUG command(s) in the HTML output are typically presented in blue, followed by a screenshot of the output after invoking the command. Thus, for convenience, the test script—in this case the HATT file—can be reconstructed if desired from the HTML results file. Aspects of the present invention described below, such as the generation of a modified test, take advantage of this.

FIG. 2 depicts an example original test script including multiple tests for automated testing of a program. In FIG. 2, the test script is in the form of a HATT file. Test script 200 includes at least six sequential tests, the start of each of which is identified by an H: record. Three of these tests are depicted in FIG. 2: a first test 202, corresponding to first H: group denoted "H: 1 Initial set up", a fifth test 204, corresponding to fifth H: group denoted "H: 5 DMSQEFL and DMSQSFSL Tests", and a sixth test 206, corresponding to a sixth H: group "H: 6 CMSLEVEL Test". Between first test 202 and fifth test 204 are second, third, and fourth tests (not pictured). Test script 200 can include additional tests sequentially after the sixth test 206. Each line of a test is referred to as a record. First test 202, for instance, contains an H: record, identifying the start of the test, C: records (corresponding to commands), and E: records (indicating expected outputs).

As noted, later test(s) may be dependent on prior test(s), such as setup commands from the prior tests. Test 202, the first test in the sequence, includes several commands denoted by C: records. Two such commands include command 202a, which defines a tempdisk identified as 1F1F, and command 202b, which formats the created tempdisk 1F1F. Dependencies on each of these commands of first test 202 exist in sixth test 206. Also, in fifth test 204, commands 204a and 204b include link and access commands which link a disk holding program DMSTESTS (used immediately) and a program called QLEVEL (referenced in later test 206). Sixth test 206, therefore, has dependencies on commands 204a, 204b of fifth test 204, since sixth test 206 references the QLEVEL program (206b). Sixth test 206 is also dependent on first test 202. Specifically, command 206a of sixth test 206 accesses tempdisk 1F1F, and command 206c invokes a program called CMSMAC, which is on the tempdisk defined by first test 202.

Sixth test 206 also includes an expected output 206d. The expected output is denoted by an 'E:' record, and the expected output of test 206 is "CMS Level 27, Service Level 000". Test 206 passes if this expected output is obtained as a result of executing test 206. If an output other than the expected output is obtained, then test 206 fails. Failure of test 206 is depicted in FIG. 3.

Figure 3:
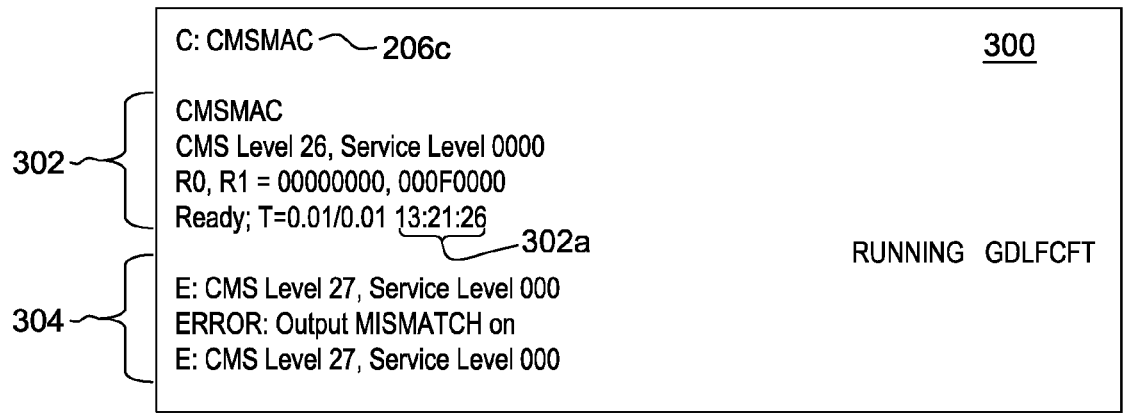
FIG. 3 depicts a portion of test results obtained based on running the original test script of FIG. 2, the test results including a failure output of a failing test.

FIG. 3 depicts a portion of test results obtained based on running the original test script of FIG. 2. In this case, test 206 (FIG. 2) has failed and the test results include a failure output of failing test 206. Referring to FIG. 3, a failure is reported in test results 300. When executing test 206, and in particular command 206c (C: CMSMAC), failure output 302 is obtained. Output 302 is a failure output because of a mismatch between it, as the obtained output from performing command 206c, and the expected output expected from performance of that command. Whereas the expected output of test 206 is "CMS Level 27, Service Level 000" (see 206d of FIG. 2), the output actually obtained based on performing test 206 is the four lines of output 302. Test results 300 indicate this failure in the bolded text 304.

Figure 4:
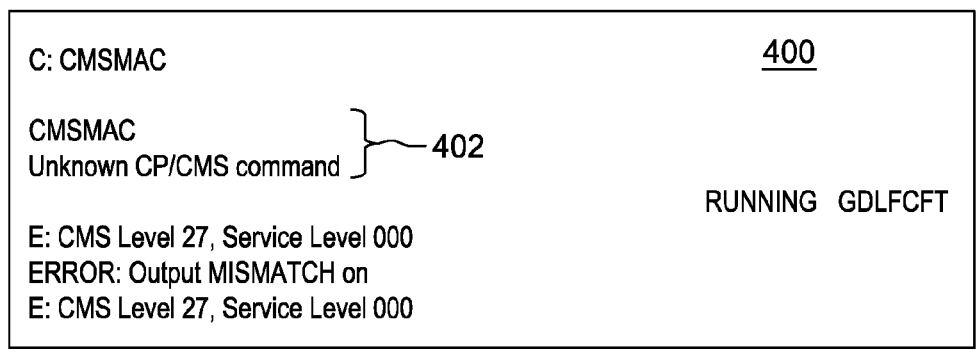
FIG. 4 depicts test results obtained by rerunning the failing test of the original test script.

When a tester learns of a failing test, one approach is to simply rerun the original failing test by itself. FIG. 4 depicts test results obtained by rerunning the failing test of the original test script from FIG. 2. The test results of FIG. 4 demonstrates a problem of simply rerunning a failing test. Test results 400 indicate that test 206 fails based, again, on an output mismatch. The tester may be tempted to conclude that the problem was successfully recreated, since a failure was obtained. However, the exact reason for the original failure (FIG. 3) was not recreated. In FIG. 4, the obtained failure output 402 indicates an unknown CP/CMS command. This is logical because of the dependency of test 206 on test 202 as described above—the CMSMAC program resides on a tempdisk created in test 202 of the original test script. The reason why failure output 402 of FIG. 4 was obtained is because the CMSMAC program is, as expected, unknown to the program being tested, since test 202 did not execute to create the tempdisk on which the CMSMAC program resides. Thus, passage/failure of later test 206 is dependent, at least in part, on setup commands 202a and 202b of test 202. Additionally, the obtained failure output from FIG. 4 is an entirely different failure from the previous failure (302 of FIG. 3) in which the CMSMAC program was available but a different mismatching output was obtained. Thus, a new (different) failure of test 206 has been created when test 206 is performed by itself; the original failure was not.

An important aspect of effective program testing is the ability to exactly recreate failures utilizing a minimal set of conditions necessary for the failure to occur. When a failure is exactly recreated with a minimal set of conditions necessary for the failure to occur, those conditions are identified and targeted in developing a patch to eliminate the failure.

In accordance with aspects of the present invention, automated program testing is facilitated through the efficient identification of minimal conditions for demonstrating a failure. Test results from performance of a test script are obtained, which test results include a failure output resulting from performance of a test of the test script. A modified version of the failing test is generated. The modified version of the failing test is generated such that the modified test passes only when the obtained failure output is obtained after executing the modified test. Thus, the modified test passes if and only if the exact failure is recreated and obtained. The program is iteratively retested, wherein a test script having the modified test and selected additional test(s) are provided for execution by the program at each iteration. When the modified test passes, the failure has been recreated.

Figure 5:
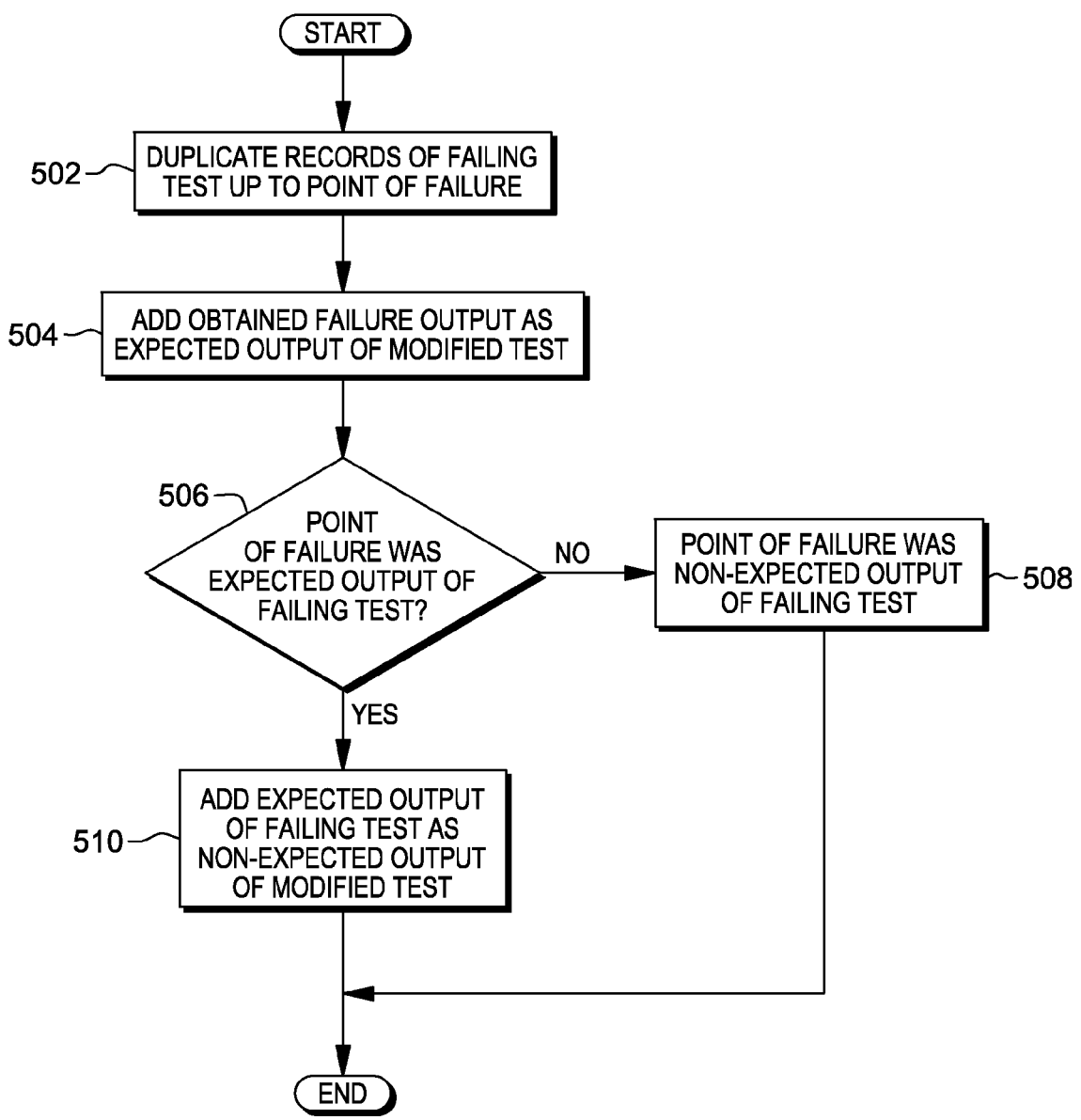
FIG. 5 depicts one example of a process for generating a modified test, in accordance with one or more aspects of the present invention.

FIG. 5 depicts one example of a process for generating a modified test, in accordance with one or more aspects of the present invention. The process begins by duplicating records of the failing test up to the point of failure of the failing test (502). The point of failure is the point of the failing test at which the test fails (e.g. the point just after a command causing a failure output to be obtained). Next, the failure output that was obtained when performing the failing test is added as an expected output of the modified test (504). As noted, an expected output of a test is an output expected to be received based on performance of that test, and therefore indicates output necessary for the test to pass.

Next, at 506, it is determined whether the point of failure was an expected output of the failing test. An expected output is an output expected to be received when performing the test. This is in contrast to a nonexpected output, which is an output expected not to be received upon executing the test. A record indicating a nonexpected output means that, in order for the test to pass, the indicated nonexpected output must not be received. The purpose of inquiry 506 is to distinguish cases in which the failing test failed because a prohibited (nonexpected) output was obtained, from cases in which the failing test failed because the output obtained was other than the specified expected output. If at 506 it is determined that the point of failure was not an expected output of the failing test (i.e. it was instead of nonexpected output, 508), then the process ends.

If, however, at 506 it is instead determined that the point of failure was an expected output of the failing test, then the expected output of the failing test at the point of failure is added as a nonexpected output of the modified test (510). When an expected output of the failing test at the point of failure is added as a nonexpected output of the modified test, it is ensured that the modified test passes only when the following are true: (i) the failure output of the failing test is obtained (determined by way of E: record added at 504) and (ii) the expected output of the failing test is not obtained (determined by way of N: record added at 510).

This latter condition is an important addition. A test may generate lots of output, only some of which is interesting in the sense of determining success or failure. If, when the program is retested by running the modified test, the failure output from the original test is obtained, but the expected output from the original test also happens to appear, the modified test would pass. However, in that case, the failure has not been exactly recreated and so passage of the modified test would incorrectly indicate that the failure has been recreated. To illustrate, suppose the program being tested is to print the standard 26-letter English alphabet and that the testing verifies the appearance of each letter. The original test would thus include an expected output of all 26 letters. Suppose the test fails because all letters except 'G' were obtained, that is, the failure output was each of the other 25 letters. Generation of the modified test would add the failure output (all other 25 letters) as expected output of the modified test (504). Assume the expected output of the original test (i.e. output of all 26 letters) was not added as a nonexpected output (i.e. assume that the process of FIG. 5 did not include 510). Then, if upon running the modified test, the program generates all 26 letters of the alphabet, the modified test will pass because the expected output (all other 25 letters) was obtained (as too was 'G'). However, the exact failure, in which 'G' is not present, was not recreated. That is, the failure output from the original test did not include 'G', but 'G' appeared in the output from running the modified test, which would pass in the scenario just described, incorrectly indicating that the exact failure was recreated.

To address the example illustrated above, the condition that 'G' not be part of the output (from performance of the modified test) should be included in the modified test. Thus, inclusion of the expected output of the failing test (the collection of all 26 letters) as a nonexpected output of the modified test (i.e. 510 of FIG. 5) addresses this. The modified test should, and will, fail (and indicate that the original failure is not exactly recreated) when, despite observing the original failure output (all other 25 letters), the original expected output (all 26 letters—which includes 'G') is also observed.

FIG. 6 depicts an example of a modified test created from the process of FIG. 5. Using the example from the previous figures in which a test is an H: group, the generation of the modified test generates a modified H: group by duplicating the steps up to the point of the failure, and then, at the failure point, adding the obtained failure output as expected output. Then, if the point of failure was an E: ("expected") record, it is changed to an N: ("not expected") record and added to the modified test. Otherwise, i.e the point of failure was an N: ("nonexpected") record, no further action is required to generate the modified test. Thus, in the example above in which failing test 206 is a failing H: group, in modified test 600 of FIG. 6, the H:, D:, and C: records of failing test 6 (206 FIG. 2) are duplicated up to the point of failure of test 206. The point of failure is the E: or N: record at which the output obtained from performing the test fails. A test can only fail once because the testing of a test ceases at the point of failure. In the case of test 206, the point of failure is E: record 206*d*.

Then, expected outputs are added to modified test 600 to require the appearance of the failure output. Thus, the failure output (302 of FIG. 3) is added as expected output of the modified test (i.e. E: records 602 are added). Note that certain failure output components, such as date or time stamps, are recognized and wildcarded. In this example, failure output 302 (FIG. 3) includes timestamp 302*a*. Date and timestamps are generally included in output to indicate the time of the (failure) output and is usually not significant in terms of recreating the failure. Thus, in generating modified test 600 (FIG. 6), the failure output from performing test 206 is added as expected output 602 to the modified test, but timestamp 302*a* from failure output 302 is wildcarded as 602*a* in modified test 600 (602*a* of FIG. 6) using '$' characters.

Finally, since the failure point of test 206 was an E: record (expected output), that expected output is added to modified test 600 as a nonexpected output (N: record 604), indicating that, in order for the modified test to pass, the expected output of the failing test at the point of failure must not be observed.

As noted above, the modified test is utilized for retesting the program in an attempt to recreate minimal conditions necessary for recreating the exact error. The modified test passes if and only if the exact error was obtained as a result of performing the modified test. Therefore, in operation, the modified test is generated and provided to test the program. In some cases, as describe previously with reference to FIG. 3, merely re-running the failing test up to the point of failure will not recreate the exact error. Consequently, in some situations, performance of the modified test alone will not be sufficient to recreate the exact error (i.e. the modified test run alone will not pass), for instance when there are dependencies of the failing test on sequentially earlier tests of the test script. Testing using the modified test might therefore include providing the modified test along with other test(s) of the original test script for testing the program Thus, testing of the program to recreate the error can, in one embodiment, proceed in a structure manner by first trying just the modified test (and optionally any clean up tests if they exist in the test script). If re-creation was unsuccessful, the modified test can be provided in a test script that includes other test(s) of the original test script, to retest the program. For instance, the modified test can be provided in a test script that also includes the test immediately preceding the failing test of the original test script. Alternatively or additionally, the modified test can be provided in a test script that also includes the first test of the original test script. If the modified test still fails to pass upon execution of the provided test script, then the modified test, the first test of the original test script, and the test immediately preceding the failing test in the original test script can be included and provided in a test script. If the modified test still fails to pass upon running the test script, then yet further tests of the original test script can be added to the test script with the modified test, and provided to the program.

In one example, addition of these further tests can proceed iteratively and sequentially (working from the failing test back towards the beginning of the test script, or working from the beginning of the test script towards the failing test), where a next test in the sequence of tests of the original test script is included in the test script with the modified test and provided for performance by the program. In all cases, the test script being provided in each iteration for performance by the program can include clean up test(s) that were present in the original test script. In one embodiment, the clean up test(s) is/are run last in each iteration of performance of the test script by the program. Clean up test(s) can be performed in each iteration regardless of whether the test script fails for that iteration.

How far the test proceeds in iteratively creating increasingly long test scripts can depend on how much time (or other resource) is available. For instance, in one example, available resources are limited such that only four combinations would be allowed for the retesting: (i) modified test alone, (ii) {test immediately preceding failing test, modified test}, (iii) {first test, modified test}, and (iv) {first test, test immediately preceding failing test, modified test}. Upon consumption of the available resource, the next attempt might best be the entire original test script to verify that exact error recreation is even possible.

Using the example described above, FIGS. 7 through 11 depict an example of the structured testing. In the first attempt at recreating the exact error, the modified test is provided, without additional tests, for retesting the program. FIG. 7 depicts a portion of test results obtained based on running the modified test of FIG. 6. As depicted in FIG. 7, the modified test fails based on a mismatch between the expected output of the modified test, and the output obtained based on performing the modified test. In particular, output 702 obtained based on performing the modified test does not match expected output 602 (FIG. 6) of the modified test. As described above, expected output 602 is the failure output from the original test 206 (FIG. 2), and failure of the modified test indicates that the exact error was not recreated. More specifically, the error output 702 created based on performance of the modified test indicates an unknown CP/CMS command (same as the error obtained in FIG. 4 in which the failing test is simply rerun).

The modified test fails because the tempdisk that the original test script created in the first H: group (test 202 of FIG. 2) does not exist. Because the tempdisk does not exist, the attempt to create a test program on the tempdisk fails (the "pipe . . . " commands of the original failing test 206 preceding the CMSMAC command thereof fail, and when the modified test calls to the program CMSMAC, the program does not exist, resulting in the "Unknown CP/CMS command" output 702). Running the modified test generates a failure, but not the exact failure that was previously experienced.

In a next attempt at recreating the error, the modified test is again provided for retesting the program, but the modified test is provided as part of a test script which also includes an initial (first) test, for retesting the program. Inclusion of the initial test in the test script could facilitate passage of the modified test, for instance if there are dependencies in the modified test on the initial test. FIG. 8 depicts one example of a test script including the modified test of FIG. 6 and an initial test, in accordance with one or more aspects of the present invention. In FIG. 8, test script 800 includes first test 202 of the original test script (FIG. 2) along with modified test 600. Thus, provision of this test script for performance by the program will retest the program with the first H: group of the original test script plus the modified failing H: group of the original test script. Inclusion of the first H: group in this test script will cause the tempdisk created thereby to exist for the CMSMAC command of the modified test.

FIG. 9 depicts a portion of test results obtained based on running the test script of FIG. 8. In this scenario, although the tempdisk exists (by virtue of inclusion of first test 202 from the original test script), modified test 600 has a dependency (802 of FIG. 8) on the fifth test 204 of the original test script (i.e. LINK and ACCess commands 204a and 204b of test 204). When modified test 600 of test script 800 attempts the 'QLEVEL' command (802), the command fails, since the disk on which it resides was not LINKed and ACCessed (which occurs in commands 204a, 204b from fifth test 204). Thus, failure output 902 of FIG. 9 is obtained, indicating unavailability of the QLEVEL command. As before, this is an observed failure but not the original failure that was obtained from performance of the original test script.

Typically, a well-written original test script would not include in a test a dependency on any other test than the setup (first) test of the test script. In other words, dependencies in a well-written original test script would not have dependencies on a test other than the initial (first) test of that test script. However, in some situations, such as the example original test script 200 in FIG. 2, a dependency in a command of a later test is dependent on an intervening test (e.g., command 206b of test 206 is dependent on fifth test 204). Thus, based on failure of the modified test as indicated in FIG. 9, it is desirable to add additional test(s) of the original test script to test script 800 to facilitate further testing in order to attempt error recreation.

In one example, addition of tests to the test script that includes the modified test, and provision of the test script to performance by the program, proceeds iteratively. In each iteration, a next additional test is added to the test script. The additional test is a next test in a sequence of tests between the first test of the original test script and the failing test of the original test script. In one example, the iterations proceed by adding additional tests in order of the sequence of tests in the original test script after the first test, i.e. by adding the second test, then third test, then fourth test, etc.

In another example, the iterations may proceed working backward in the sequence (i.e. first test immediately preceding the failing test, then the test immediately preceding that test, etc.). Such an example appears in FIG. 10, which depicts another example of a test script including the modified test of FIG. 6 and multiple additional tests, in accordance with one or more aspects of the present invention. Test script 1000 of FIG. 10 includes first test 202, fifth test 204, and modified test 600. In this example, not only is first test 202 included in the test script along with modified test 600, but the test script also includes an additional test from the sequence of test(s) between first test 202 and original failing test 206. In the example of FIG. 10, the first test preceding the original failing test is added, i.e. fifth test 204, which is the last test in the sequence between first test 202 and original failing test 206, is included in the test script.

Figure 11:
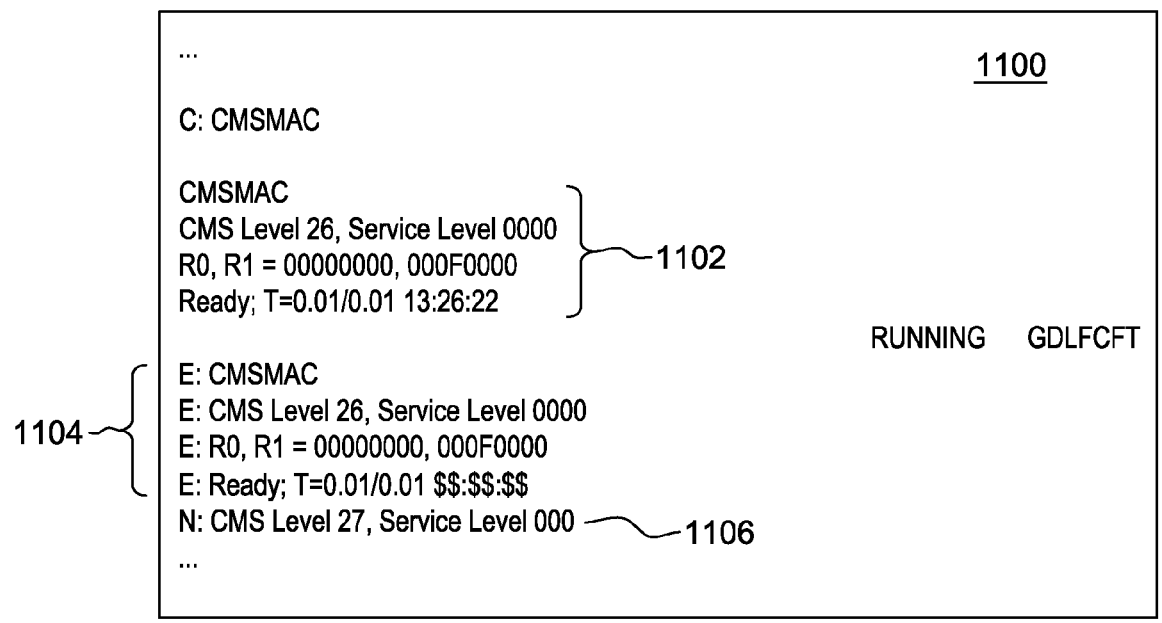
FIG. 11 depicts a portion of the test results obtained based on running the test script of FIG. 10, in accordance with one or more aspects of the present invention.

FIG. 11 depicts a portion of test results obtained based on running the test script of FIG. 10. Test results 1100 demonstrate that the modified test now passes when the program performs test script 1000. Passage of the modified test in this case indicates that the exact error obtained from the original test script has been recreated. This is illustrated by output 1102 of the modified test, which matches the expected output 1104 of that test, and which does not contain the nonexpected output 1106 of the failing test (corresponding to the original expected output 206d of failing test 206).

Since modified test 600 passes, test script 1000 (FIG. 10) has recreated the original error using first test 202, fifth test 204, and modified test 600. This is valuable information to a tester, who can identify based on the contents of test script 1000 which tests are, or may be, at least partially responsible for bringing about the original failure.

If modified test 600 test script 1000 had instead failed based on performance thereof by the program, then a next test (such as the test immediately preceding test 204 of the original test script) would have been added to test script 1000 in the next iteration.

From the foregoing, automated program testing is facilitated in accordance with one or more aspects of the present invention. One example method to facilitate automated program testing is depicted and described with reference to FIG. 12. In one example, the process is performed by a data processing system, such as data processing system 100 of FIG. 1.

Figure 12:
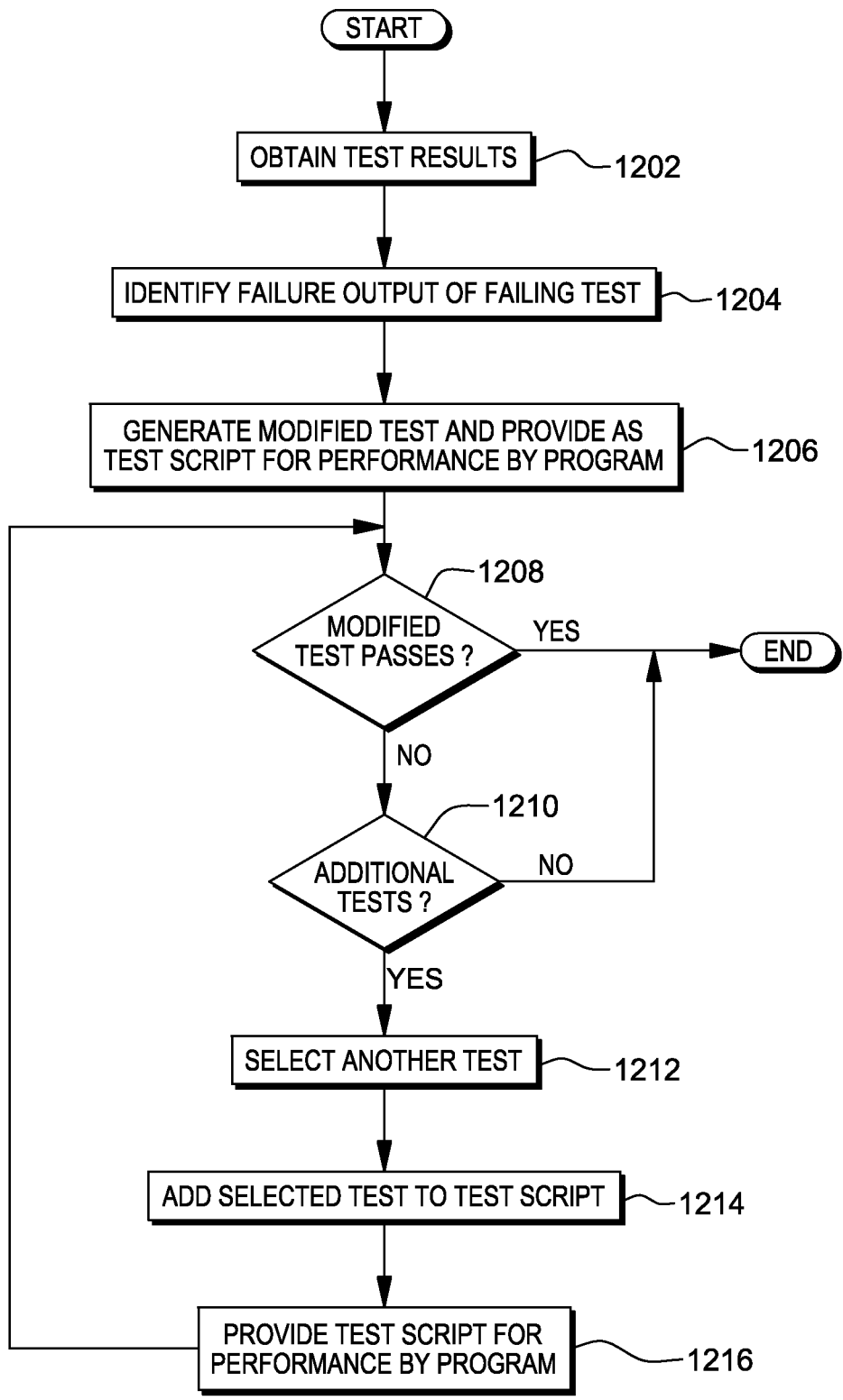
FIG. 12 depicts one example of a method for facilitating automated program testing, in accordance with one or more aspects of the present invention.

In one specific embodiment, the program being tested resides (and executes test scripts) on the data processing system performing the method of FIG. 12. In another embodiment, the data processing system performing the method of FIG. 12 is separate from the data processing system on which the program resides and on which testing of the program occurs. An example system of the latter embodiment is a remote data processing system that receives test results, and generates and returns test script(s) to a system for performance of the testing.

The process begins by obtaining test results (1202). The test results are generated based on performance of one or more tests by a program, such as one or more tests of a test script. Next, a failure output of a failing test of the one or more tests is identified (1204). A modified test based on the failing test is automatically generated and provided as a test script for performance thereof by the program (1206). In one example, the modified test is generated according to the process described and depicted above in connection with FIG. 5. In one example, the test script includes only the modified test. In other examples, the test script provided at this point might include additional tests.

Sometime after the modified test is generated and provided in a test script for performance by the program, the program performs the test(s) of the provided test script. A determination is made as to whether, after performing the test(s) of the provided test script, the modified test has passed (1208). If so, then the process ends. By the processing ending, the provided test script includes test(s) which, when performed by the program, recreate the original failure, which can be useful information for a program tester.

If instead at 1208 it is determined that the modified test has not passed, it is determined whether additional tests are to be added to the test script with the modified test (1210). In one example, this inquire determines whether there are any additional tests of the original one or more tests performed by the program which are to be tested along with the modified test. For instance, the test script which includes the original one or more tests is examined to determine whether other tests exist therein which are to be added to the test script with the modified test, and provided for further testing of the program. In another example, inquiry 1210 determines whether additional resources are available and/or should be dedicated to further testing of the program.

If inquiry 1210 determines that there are no additional tests to be added to the test script with the modified test, then the process ends. Otherwise, the process continues by selecting another test of the one or more original tests (1212) and adding the selected test to the test script (1214). The selected another test could, in one example, be a first test of the test script with the one or more original tests that were performed by the program. In another example, the selected another test could be the test immediately preceding the original failing test in the test script with the one or more original tests. Alternatively, the selected another test could be a next test in a sequence of tests between the first test and the original failing test. Additionally, it may be desirable in some examples to select and add more than just one test at this point to the test script, and/or to remove one or more tests of the test script.

In any case, the test script which now has the added selected another test, is provided for performance by the program (1216). Again, sometime after the test script is provided for performance by the program, the program performs the tests of the provided test script. The process then returns to inquiry 1208 wherein it is again determined whether the modified test has passed. As before, if the modified test has passed, then the process ends, otherwise the process repeats (iterates) with selection and addition of another test to the test script, and providing again the test script for performance by the program. The process ends when (i) the modified test has passed (1208) or (ii) it is determined that no additional tests are to be added to the test script with the modified test (1210), such as if available resources have been consumed, or if there are no more tests of the one or more original tests to be added to the test script, as examples.

Selection and addition of additional tests for testing with the modified test can follow any desired structured progression. In one example, the modified test is tested along with the first test of the one or more original tests (e.g. FIG. 8), then is tested with a test immediately preceding the original failing test, and then is tested with the first test and a next test from a sequence of tests, working forward or backward in the sequence between the first test and the original failing test (such as in FIG. 10 where the first test 202 and test 204, which is selected in the first iteration working backward from the original failing test to the first test, are tested).

It is worth noting that the process need not be perfect in order to be useful. If the process of FIG. 12 ends and was unable to recreate the failure, that in itself is useful information to a tester. If recreation of the failure is not possible, at least no time was spent by a tester (such as by a human operator of a testing machine) attempting to recreate the failure, and only very little time is spent by the operator in evaluating that the failure could not be recreated. And, in some situations, inability to recreate the failure would indicate a poorly designed or poorly written test case (original test script)—where success or failure of the original test script does not confirm or rule out a software bug.

As described above, in accordance with aspects of the present invention, automated program testing is facilitated using an original test structure that produces an output file showing activity driven by the automated testing and highlighting a failure output of a failing test. The failure output is revised into an expected output for a modified version of the failing test. This modified test case is defined to pass only if the failing output (from the failing test) is obtained. This modified test is then subset in ways suggested by the original test structure, and the subsets are used to attempt recreation of the failure. The attempts are made in a predetermined order, balancing the desirability of a minimal recreation with the need to prove that recreation is possible, and all of the above can be automated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 13:
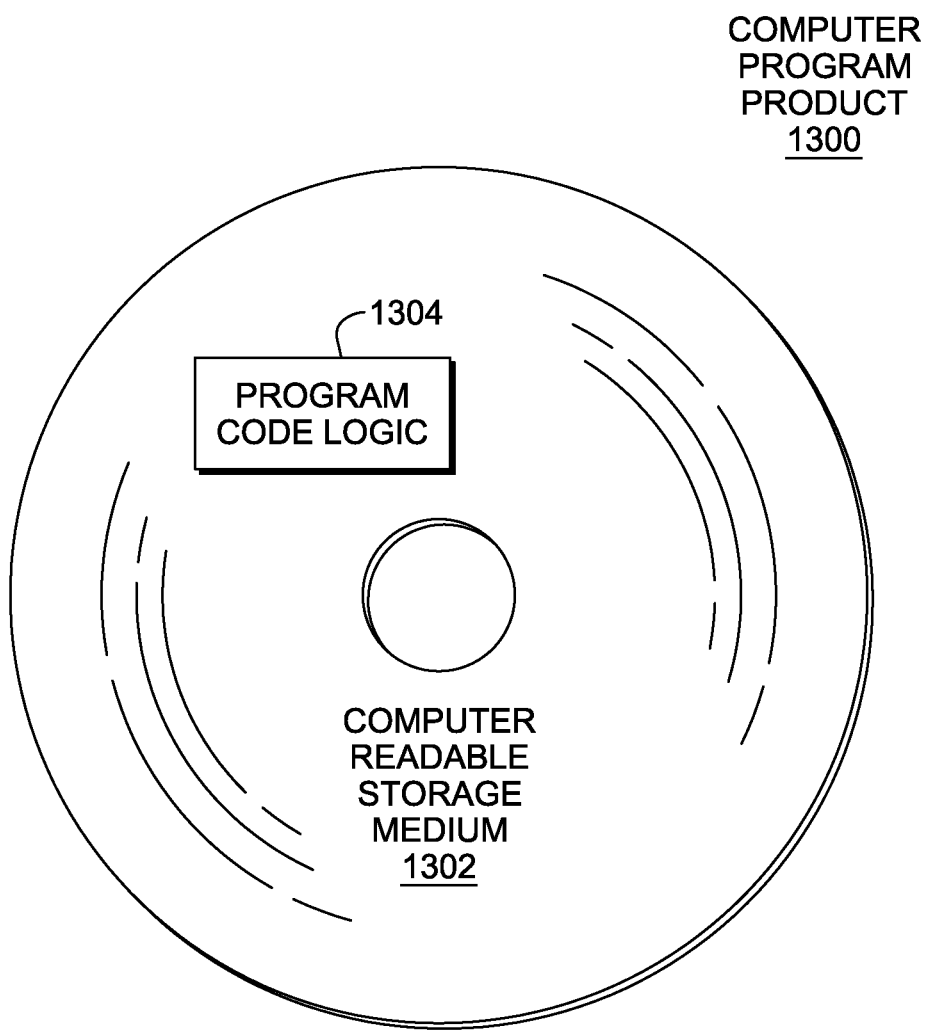
FIG. 13 depicts one embodiment of a computer program product incorporating one or more aspects of the present invention.

Referring now to FIG. 13, in one example, a computer program product 1300 includes, for instance, one or more computer readable media 1302 to store computer readable program code means or logic 1304 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method for facilitating automated program testing, the method comprising:
   obtaining test results generated based on performance of at least two tests by a program, the at least two tests being of a test script, and the at least two tests for testing the program, wherein a test passes or fails based on output obtained based on performance of the test by the program;
   identifying a failure output of the test results, the failure output being of a failing test of the at least two tests, the failing test specifying at least one command performed by the program, and the failure output being obtained based on a failure of the program resulting from the program performing the specified at least one command; and
   automatically generating, by a processor, a modified test based on the failing test, the modified test for performance thereof by the program to facilitate testing of the program, and the modified test comprising the at least one command, wherein the modified test is to pass based on obtaining the identified failure output of the failing test should the modified test be performed by the program, wherein passage of the modified test based on obtaining, as a result of performing the modified test, a passing output, the passing output comprising the identified failure output, indicates that the failure of the program persists;
   providing the modified test for performance thereof by the program;
   based on performance of the modified test by the program, determining whether the modified test has passed;
   based on determining that the modified test has not passed, selecting another test of the at least two tests; and
   providing another test script, the another test script including the modified test and the selected another test for performance of the another test script by the program, wherein performance of the another test script comprises performance by the program of tests included in the another test script.

2. The method of claim 1, wherein the failing test further comprises an expected output expected to be obtained based on performance of the at least one command, wherein the failing test fails based on obtaining an output other than the expected output of the failing test, and wherein the identified failure output comprises the obtained output other than the expected output of the failing test.

3. The method of claim 2, wherein automatically generating the modified test comprises including in the modified test an expected output of the modified test, the expected output of the modified test being the obtained output other than the expected output of the failing test, wherein the modified test passes based on obtaining the expected output of the modified test.

4. The method of claim 1, wherein the failing test specifies a nonexpected output, the nonexpected output being output expected not to be obtained based on performance of the at least one command, wherein the failing test fails based on obtaining the nonexpected output, and wherein the identified failure output comprises the nonexpected output.

5. The method of claim 4, wherein automatically generating the modified test comprises including in the modified test an expected output of the modified test, the expected output of the modified test being the nonexpected output specified in the failing test, wherein the modified test passes based on obtaining the expected output of the modified test.

6. The method of claim 1, wherein the at least two tests comprise a sequence of tests, and wherein the selected another test comprises a first test in the sequence of tests.

7. The method of claim 6, wherein failure or passage of the failing test is dependent, at least in part, on at least one setup command of the first test, and wherein inclusion of the first test in the another test script facilitates passage of the modified test based on execution of the at least one setup command of the first test in performance of the another test script by the program.

8. The method of claim 1, further comprising:
   determining, based on performance of the another test script, whether the modified test has passed; and
   based on determining that the modified test has not passed, repeating the selecting another test, the providing another test script, and the determining, based on performance of the another test script, whether the modified test has passed, wherein repeating the providing comprises adding the selected another test to the another test script.

9. The method of claim 8, wherein the failure output is indicative of occurrence of an error in the program, wherein the repeating is performed until it is determined that the modified test passes, and wherein passage of the modified test indicates that the another test script includes tests from the at least two tests necessary to recreate occurrence of the error in the program.

10. The method of claim 8, wherein in the sequence of tests, at least one test exists between the first test in the sequence and the failing test, and wherein repeating the selecting selects, working backward in the sequence of tests from the failing test to the first test, a next test of the at least one test to add to the another test script.

11. The method of claim 8, wherein the at least two tests comprise a cleanup test, and wherein the provided another test script further includes the cleanup test.

12. A computer system for facilitating automated program testing, the computer system comprising:
   a memory; and
   a processor, in communications with the memory, wherein the computer system is configured to perform:
      obtaining test results generated based on performance of at least two tests by a program, the at least two tests being of a test script, and the at least two tests for testing the program, wherein a test passes or fails based on output obtained based on performance of the test by the program;
      identifying a failure output of the test results, the failure output being of a failing test of the at least two tests, the failing test specifying at least one command performed by the program, and the failure output being obtained based on a failure of the program resulting from the program performing the specified at least one command; and
      automatically generating a modified test based on the failing test, the modified test for performance thereof by the program to facilitate testing of the program, and the modified test comprising the at least one command, wherein the modified test is to pass based on obtaining the identified failure output of the failing test should the modified test be performed by the program, wherein passage of the modified test based on obtaining, as a result of performing the modified test, a passing output, the passing output comprising the identified failure output, indicates that the failure of the program persists;

providing the modified test for performance thereof by the program;

based on performance of the modified test by the program, determining whether the modified test has passed;

based on determining that the modified test has not passed, selecting another test of the at least two tests; and providing another test script, the another test script including the modified test and the selected another test for performance of the another test script by the program, wherein performance of the another test script comprises performance by the program of tests included in the another test script.

13. The computer system of claim 12, wherein the failing test further comprises an expected output expected to be obtained based on performance of the at least one command, wherein the failing test fails based on obtaining an output other than the expected output of the failing test, and wherein the identified failure output comprises the obtained output other than the expected output of the failing test.

14. The computer system of claim 12, wherein the at least two tests comprise a sequence of tests and the selected another test comprises a first test in the sequence of tests, wherein failure or passage of the failing test is dependent, at least in part, on at least one setup command of the first test, and wherein inclusion of the first test in the test script facilitates passage of the modified test based on execution of the at least one setup command of the first test in performance of the test script by the program.

15. The computer system of claim 12, wherein the computer system is further configured to perform:

determining, based on performance of the another test script, whether the modified test has passed; and based on determining that the modified test has not passed, repeating the selecting another test, the providing another test script, and the determining, based on performance of the another test script, whether the modified test has passed, wherein repeating the providing comprises adding the selected another test to the another test script.

16. A computer program product for facilitating automated program testing, the computer program product comprising:

a non-transitory computer readable storage medium readable by a processor and storing program code for execution by the processor to perform a method comprising:

obtaining test results generated based on performance of at least two tests by a program, the at least two tests being of a test script, and the at least two tests for testing the program, wherein a test passes or fails based on output obtained based on performance of the test by the program;

identifying a failure output of the test results, the failure output being of a failing test of the at least two tests, the failing test specifying at least one command performed by the program, and the failure output being obtained based on a failure of the program resulting from the program performing the specified at least one command; and automatically generating a modified test based on the failing test, the modified test for performance thereof by the program to facilitate testing of the program, and the modified test comprising the at least one command, wherein the modified test is to pass based on obtaining the identified failure output of the failing test should the modified test be performed by the program, wherein passage of the modified test based on obtaining, as a result of performing the modified test, a passing output, the passing output comprising the identified failure output, indicates that the failure of the program persists;

providing the modified test for performance thereof by the program;

based on performance of the modified test by the program, determining whether the modified test has passed;

based on determining that the modified test has not passed, selecting another test of the at least two tests; and providing another test script, the another test script including the modified test and the selected another test for performance of the another test script by the program, wherein performance of the another test script comprises performance by the program of tests included in the another test script.

17. The computer program product of claim 16, wherein the failing test further comprises an expected output expected to be obtained based on performance of the at least one command, wherein the failing test fails based on obtaining an output other than the expected output of the failing test, and wherein the identified failure output comprises the obtained output other than the expected output of the failing test.

\* \* \* \* \*